Patented May 17, 1949

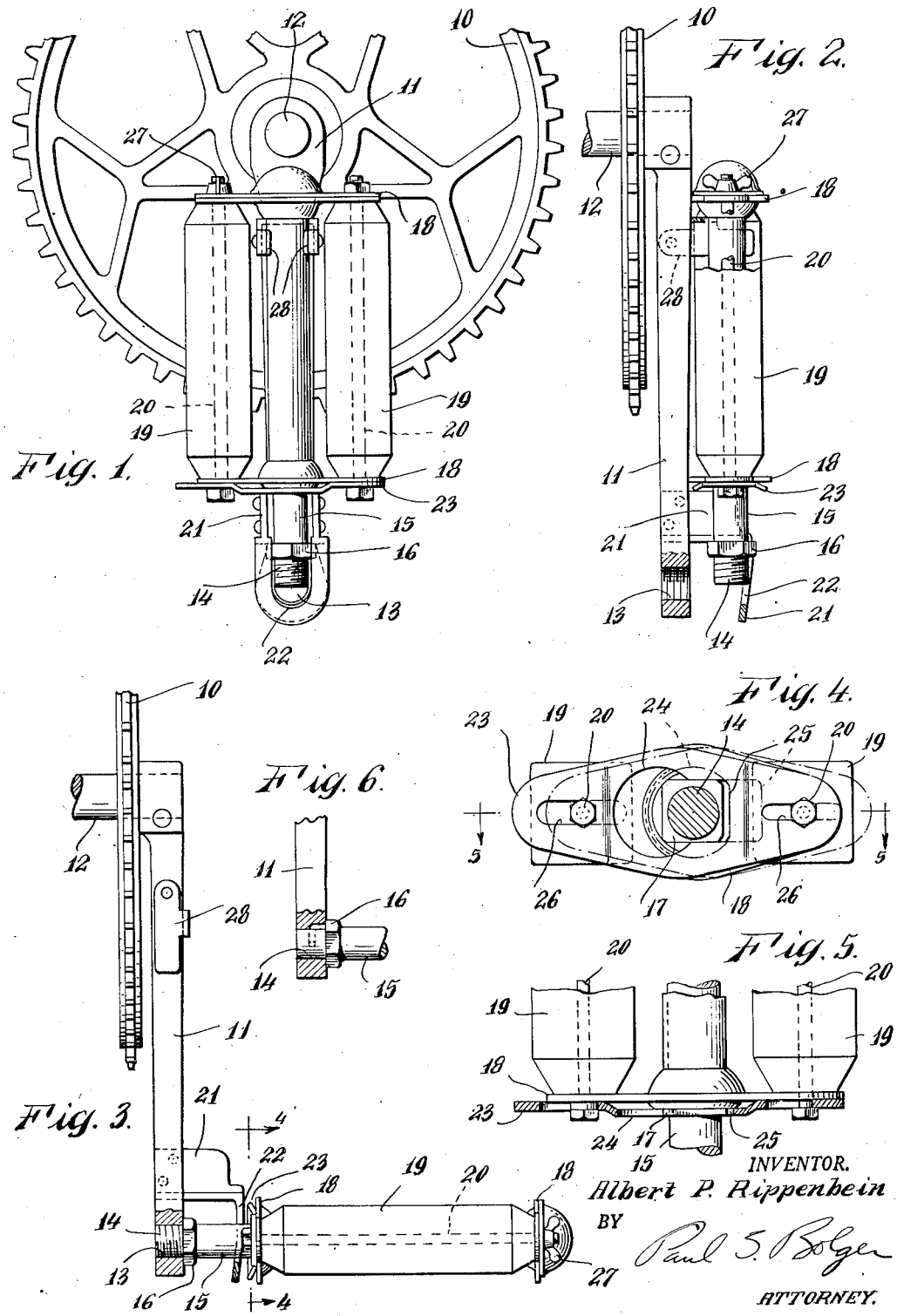

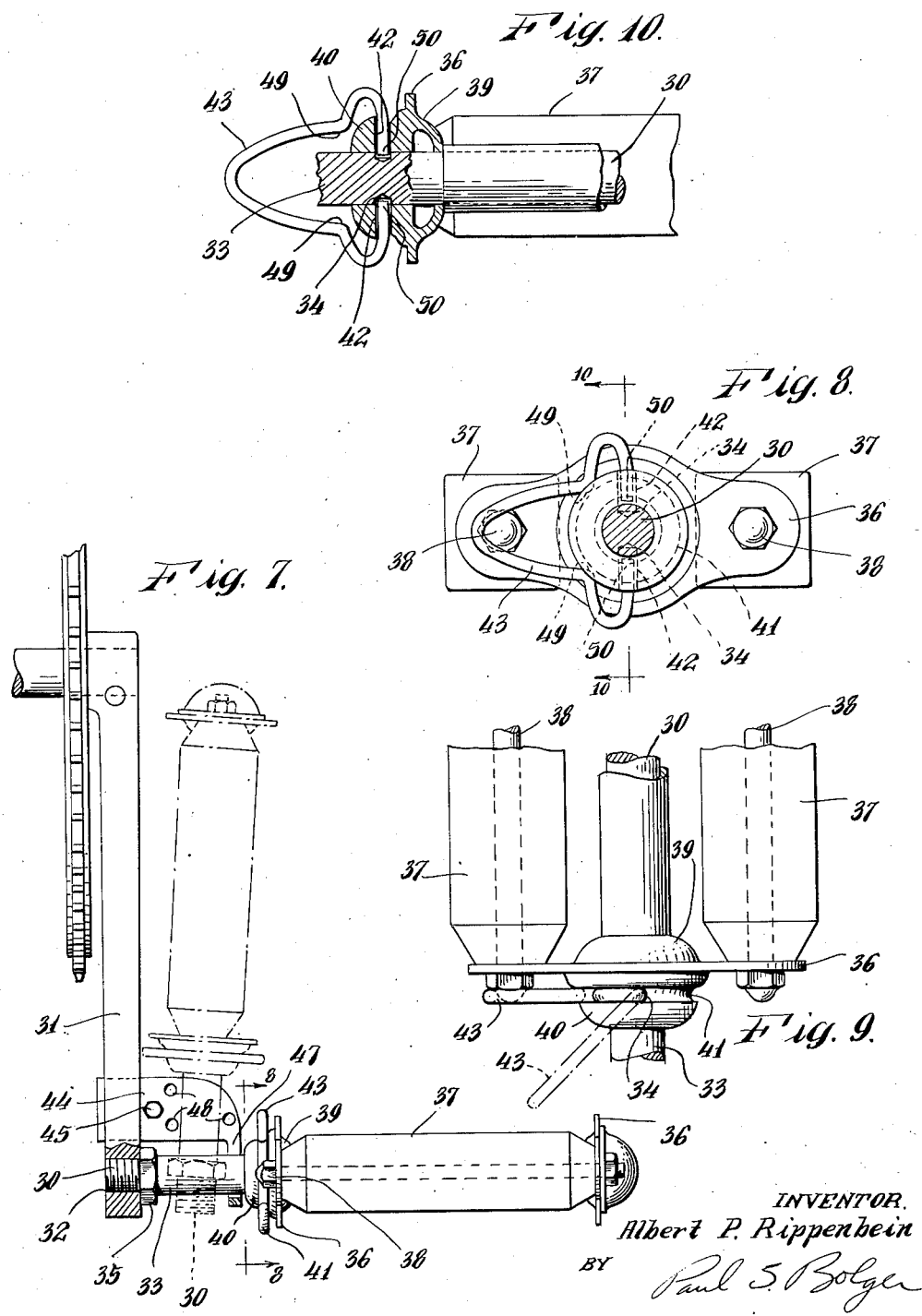

2,470,414

UNITED STATES PATENT OFFICE 2,470,414

FOLDING PEDAL WRENCH

Albert P. Rippenbein, New York, N. Y.

Application May 27, 1948, Serial No. 29,465

7 Claims. (Cl. 74—594.4)

This invention relates to driving means for bicycles and is specifically directed to the provision of a novel combination of parts whereby the pedal axles or shafts (and therefore the pedals mounted thereon) may be quickly detached from operative engagement with the cranks and temporarily fixed in a position adjacent the cranks and approximately parallel thereto so that, in effect, the pedals lie in the same general plane occupied by the other bicycle parts.

This application contains subject matter originally a part of my copending application filed April 6, 1945, Serial No. 586,962 and divided therefrom.

The protrusion of the pedals from the general area occupied by the frame of the bicycle prevents compact packing of the bicycles against the side of a vehicle and likewise complicates the stacking of the bicycles one against the other when, as in the case of military usage, quantities of bicycles must be quickly handled and transported. Removal and assembly of the pedal shafts from or on the cranks involves the use of a wrench or similar tool which is not always readily at hand. Moreover, the pedal shafts and their attached pedals once removed are easily lost or misplaced. Therefore where bicycles are alternatively transported and used, ready removal of the pedals from their operative position into the plane of the other bicycle parts without detachment of the pedal shafts and their attached pedals from said parts, is particularly advantageous.

The combination of crank pedal shaft and pedal described herein are so linked together that the pedal shaft and the attached pedal once removed from operative engagement with the crank, may, without actual detachment from the crank, be quickly fixed into a temporary position alongside and adjacent the crank. Such combinations are the subject of my copending application Serial No. 29,464 and filed May 27, 1948. The present invention is directed to means by which the pedal may itself become the medium through a turning moment may be applied to disengage the pedal shaft from operative connection with the crank thereby eliminating the use of any separate tool for this purpose.

Preferred embodiments of this invention are illustrated in the attached drawing; in which Fig. 1 illustrates, in side elevational view, an assembly of sprocket, crank, pedal shaft and pedal with the pedal parts fixed in the temporary or non-operative position;

Fig. 2 is a front elevational view, with some parts in section, of the assembly shown in Fig. 1;

Fig. 3 is a front elevational view, with some parts in section, of the same assembly with the pedal parts now in operative position on the crank;

Fig. 4 is a view of the parts shown in Fig. 3 taken at the line 4—4 as indicated in Fig. 3;

Fig. 5 is a view, partly in elevation and partly in section, of the parts shown in Fig. 4, when viewed as indicated by the line 5—5 of the latter figure;

Fig. 6 illustrates, partly in section and partly in elevation, an alternative form of locking arrangement between the crank and the pedal shaft when the pedal parts are in operative position;

Fig. 7 is a front elevational view of another form of my invention with some parts in section showing the pedal parts in operative position on the crank, the dot and dash line indicating the position of the pedal when the pedal shaft has been removed from operative position;

Fig. 8 is a view of the parts shown in Fig. 7 taken at the line 8—8 in Fig. 7;

Fig. 9 is a partial elevational view of the form of my invention shown in Fig. 7; and Fig. 10 is a view of my invention partly in section taken at the line 10—10 in Fig. 8.

Referring to Figures 1 to 5, the sprocket 10 and crank 11 are fixed to a drive shaft 12. An aperture 13 located at the extremity of the crank provides means for operatively engaging a pedal shaft in crank driving position, i. e., at approximate right angles to the crank.

The pedal shaft 14 may best be described as comprising an axle, upon which the pedals are rotatively and conventionally mounted, and an intermediate or extending portion 15 which spaces the axle portion from the crank engaging end of the shaft. A shoulder 16 on the pedal shaft serves its usual function as an abutment to limit the movement of the end of the shaft into crank aperture 13 and has, in addition, another function later herein described.

In accordance with this invention there is likewise provided on the pedal shaft a planar surface.

In the embodiment shown, in Figs. 1–6, this surface is presented by the squared shoulder 17 formed on the shaft 14 at approximately the point of junction between the axle portion and the intermediate portion 15. The pedal structure proper consists of crossed arms 18 suitably journaled for rotation on the axle portion of the shaft 14. Between said arms 18 and mounted on bolt axles 20 which extend through the arms 18 are the rubber pads 19. Except for the extension, or intermediate portion, 15 of the pedal shaft and the planar surface provided by the flat-faced shoulder 17, the parts thus far described are conventional in design and their assembly is found in most bicycles. Specific construction of these particular parts is of little consequence to this invention. In fact it is a feature of this invention that a modern bicycle may be adapted to embody the principles thereof by substitution of a new pedal shaft, and the addition to the conventional assembly of various parts now to be described.

One such part is the means 21 fixed to the crank 11 intermediate its ends which means is designed to provide a loose but positive connection between the pedal shaft and crank thereby preventing the removal of the pedal from the bicycle but allowing movement of the pedal shaft and its attached pedal from operative position to a position adjacent and parallel to the crank. Means 21 is, therefore, in effect, a loose pivot and, in the form here shown, consists of an upwardly extending yoke-like arm which defines a slot or aperture 22 sized to receive and loosely surround the intermediate shaft portion 15, the shoulder 16 serving as means to prevent the shaft end from slipping through the slot 22 and thereby disengaging the pedal parts from the closed yoke. Likewise mounted on the crank 11, and at a point spaced from the coupling means 21, is the clip 28 which serves as a means to grasp the pedal shaft 14 as it is raised to its non-operative position adjacent the crank 11. The function and action of said clip is clearly shown in Figs. 1 and 2. The clip 28 is so mounted on crank 11 that it may be swung out of its functional position into the position shown in Fig. 3 when the pedal parts are operatively mounted on the crank, thereby avoiding inconvenience or injury to the operator of the bicycle. Thus, by providing a pedal shaft of suitable configuration and by mounting on the crank the means 21 to loosely yoke the shaft to the crank and provide a loose pivot and guideway for the movement of the shaft from its operative to its non-operative position, in which latter position it is maintained by the means 28, I am able, by simple alteration of any bicycle, to provide a crank and pedal assembly the parts of which may be quickly collapsed or "folded" into the general plane of the other parts of the bicycle.

The combination of parts just described is a portion of the subject matter of my copending application Serial No. 29,464 and filed May 27, 1948, and is there more fully described and claimed. This invention is directed to an improvement of said combination by which the use of a separate tool for disengaging the pedal from the crank or re-engaging the pedal with the crank is eliminated. To this end I provide means for temporarily locking the pedals against rotation on the pedal shaft, thus allowing the use of the relatively broad surfaces of the pedal assembly as a lever to exert sufficient turning motion on the shaft to engage or disengage the interlocking surfaces formed on the crank aperture 13 and the end of the shaft 14. These interlocking surfaces may take various forms, such as the conventional screw threads illustrated in Figs. 1, 2 and 3 or the bayonet type of locking surfaces illustrated in Fig. 7 or any other surfaces formed to frictionally engage when the shaft end is inserted and turned within the crank aperture. While the means by which the pedal arms 18, and thereby the pedals, are locked against rotation on shaft 14 may take various specific forms, one form shown in the drawings in Figs. 1–5 comprises the use of a movable or locking plate 23 bearing a surface which may be moved into engagement with the planar surface formed on the pedal shaft thereby locking the pedals against rotation on the shaft. In the specific form shown in the drawings the movable plate 23 defines a large opening 24 which, when the plate is lying in its normal or dot and dash line position (indicated in Fig. 4), axially corresponds with shaft 14, thus allowing the pedals to rotate freely. The plate is likewise provided with the square-shaped aperture 25 so located that shifting of the plate to its locking, or full-line, position (see Fig. 4) will bring this square aperture into contact with the surfaces of the squared shoulder 17, thus forming a positive lock between the pedal and the pedal shaft. To allow side moving of plate 23, the plate is provided with slots 26 through which pass the bolt axles 20. Slots 26 are shaped to allow the necessary movement of the plate sideways of the pedals to bring the opening 24 or the opening 25, as desired, into alignment with the shaft 14. A wing nut 27, or other easily adjusted locking device, may be provided on one of the bolt axles 20 whereby the force exerted by one end of the bolt axle on the plate 23 may be readily adjusted to allow easy shifting of that plate. Force applied to the thus locked pedals will serve to disengage the threaded, or otherwise interlocking, surfaces of the pedal end and the crank aperture 13, whereupon the pedal parts thereby disengaged from the crank may be swung around their pivot 21 into engagement with clip 28, in which position they are held until use of the bicycle is again required, at which time the pedal parts are again swung into operative position and the end of pedal shaft 14 is screwed into crank aperture 13 and the movable locking plate 23 thereafter shifted to disengage the planar surface on the shaft 14, thus unlocking the pedals for operative rotation.

Alternate forms of my invention are shown in Figs. 7 to 10 inclusive to which reference is now made. The pedal shaft 30 is operatively fixed to the crank 31 at aperture 32 located at the extremity of the crank 31 which is in turn fixed to the standard bicycle shaft and sprocket.

The pedal shaft 30 comprises an axle portion upon which pedals are mounted in the conventional manner and an intermediate portion which spaces the axle portion from the crank engaging end of the shaft. The shoulder 35 serves as an abutment to limit the movement of the end of the shaft into the crank aperture 32 and also the function now described.

The yoke-like member 44 is fixed to the crank 31 adjacent the pedal shaft receiving aperture 32. The yoke is rigidly snubbed on the crank 31 by the tightening of nut and bolt 45. The yoke is provided as a pivot means for a loose but positive connection between the pedal shaft 30 and the crank 31 to prevent the removal of the pedal from the bicycle but allowing movement of the pedal shaft and pedal from operative position to a position parallel to the crank 31. The yoke defines a slot or aperture 47 sized to receive and loosely surround the intermediate portion 33 of the pedal shaft 30. The shoulder 35 serves as means to prevent shaft from slipping through the slot 47. Nodular projections 48 are arranged on the inner surfaces of the yoke 44 so that when the pedal shaft 30 is swung out of operative position to a position parallel to the crank 31, the camming action of the shaft against the projections 48 on the opposed inner surfaces of the yoke cause the side walls of the yoke to yield slightly and to snap back to their original position after the shaft has passed thereby effectively locking the shaft in the non-operative position adjacent the crank 31 as shown by the dot dash line in Fig. 8.

As an alternate method of temporarily locking the pedal against rotation on the pedal shaft for disengaging and reengaging the pedal and the crank, the following provision is made: On the pedal shaft 30 at the juncture of the axle portion and intermediate portion 33 are located drill holes or depressions 34, which are diametrically opposed. The pedal structure is of the conventional type and consists of the cross arms 36 journalled for rotation on the axle portion of the shaft 30. Rubber pads 37 are mounted on bolt axles 38 in the conventional manner. The hub 39 mounted on the inner cross arm 36 has a knob-like head portion 40 and an annular groove 41 at the base of the knob 40, two diametrically opposed radial channels extend from the trough of the groove to the pedal shaft 30, the channels having the same diameter as the depressions 34 in the shaft and positioned so that they may be aligned with the depressions, a spring steel wire clip 43 having a configuration as shown in Figs. 8, 9 and 10 is positioned in the channels 42.

To lock the pedal on the pedal shaft 30 so that it may be used as a wrench to remove the pedal shaft 30 from the aperture 32 in the crank 31 the wire clip 43 is pivoted from its position in the groove 41, parallel to the cross arms 36 of the pedal (as shown in Figs. 8 and 9) to the position shown in Fig. 10 and by the dot dash line shown in Fig. 9. The spring action of the wire clip 43 causes the opposed ends of it to enter the depressions 34 when the pedal shaft 30 is rotated to the point where the channels 42 are aligned with the depressions, thereby locking the pedal and pedal shaft, thus allowing the use of the relatively broad surfaces of the pedal as a lever to disengage the pedal shaft from its connection with the crank.

To release the temporary locking means so that the pedal may rotate freely on the pedal shaft the clip 43 is rotated as shown in Fig. 9 from the dot dash line position to the full line position in which it is perpendicular to the pedal shaft 30. As the clip 43 is rotated the projections 49 of the clip contact the knob-like head portion 40 of the hub 39 and are forced apart by camming action as the diameter of the knob 40 increases toward the base. The opposed ends 50 of clip 43 are withdrawn from the depressions 34 by the movement of the projections 49 apart. The annular groove 41 is provided as a means of holding the clip 43 so that it will not interfere with the operation of the bicycle, the clip being held by the snap locking action of the projections 49 on the wire clip when they enter the groove. The groove is of sufficient depth to retain the projections 49 and act as a temporary lock, however, it is not so deep that it allows the projections to move together to the point where the opposed ends 50 of the clip 43 would re-enter the depressions 34.

My invention has been described herein using for examples several alternative forms and it will be understood that an interchange of the parts and a substitution or change in form of the parts may be made without a departure from the principle of my invention. It is not intended to limit my invention to the illustrated forms except as such limitations are expressed in the appended claims.

What is claimed is:

1. In a bicycle drive which includes a crank, a pedal shaft, a pedal rotatably mounted on said shaft, an aperture formed in the extremity of said crank, an end formed on said shaft for insertion in said aperture and surfaces formed on said aperture and said shaft end to frictionally engage each other as the shaft end is turned in the aperture, the improvement consisting of a planar surface formed on said shaft and means associated with said pedals and movable into engagement with said planar surface to prevent rotation of said pedal on said shaft whereby turning force may be applied through said pedal to turn the shaft end in the crank aperture.

2. In combination, a pedal device for bicycles comprising a pedal shaft and a pedal rotatably mounted thereon, and means for locking said pedal against rotation, said means comprising a part mounted on said pedal and movable to engage a surface of said shaft.

3. In a pedal device for bicycles, in combination, a pedal shaft having an axle portion and bearing a planar surface adjacent said axle portion, pedal arms rotatably mounted on said axle portion and a part associated with one of said arms and movable to contact said planar surface thereby to prevent rotation of the pedal on said shaft.

4. In a pedal device for bicycles in combination, a pedal shaft, at least one depression formed in the surface of said shaft, a pedal rotatably mounted in the pedal shaft, means associated with the pedal having at least one arm sized to enter said depression thereby to prevent the rotation of the pedal on the shaft, said means being manually operative to enter said depressions.

5. In a pedal device for bicycles in combination, a pedal shaft, diametrically opposed depressions formed in the surface of said shaft, a pedal rotatably mounted on the shaft and a means associated with the pedal and positioned thereon so that it may be manually operated to engage the depressions and thereby to prevent the rotation of the pedal on the pedal shaft, said means comprising a spring clip having opposed ends sized to fit the said depressions and held out of engagement with said depressions by the camming action of said clip against parts of the pedal.

6. In a pedal device for bicycles in combination, a pedal shaft, diametrically opposed depressions formed in the surface of said shaft, a pedal rotatably mounted on said shaft having a hub with two diametrically opposed radial channels extending from the outer surface of the hub to the pedal shaft, the opposed ends of a spring clip disposed in said channels, said opposed ends being sized to enter the said depressions and thereby prevent rotation of the pedal on said shaft, a camming surface on said hub to withdraw the opposed ends of the clip from engagement with the depressions.

7. In a pedal device for bicycles for locking the pedal against rotation on a pedal shaft in combination, a pedal shaft, diametrically opposed depressions formed in the surface of said shaft, a pedal rotatably mounted on said shaft having a hub with two diametrically opposed radial channels, opposed ends of a spring clip pivotally mounted therein so that the clip may be rotated to contact camming surfaces of the hub to thereby withdraw the opposed ends of said clip from engagement with said depressions to allow the pedal to freely rotate on said pedal shaft and means disposed on said hub to prevent the spring clip from accidentally rotating to the position where the opposed ends would engage the depressions.

ALBERT P. RIPPENBEIN.

No references cited.